United States Patent [19]

Vibbert et al.

[11] 4,400,402
[45] Aug. 23, 1983

[54] METHOD FOR PRODUCING DRIED, PUREED VEGETABLES

[75] Inventors: Bruce L. Vibbert; Fred W. Billerbeck; Kenneth P. Hoersten, all of Fremont, Mich.

[73] Assignee: Gerber Products Company, Fremont, Mich.

[21] Appl. No.: 350,524

[22] Filed: Feb. 19, 1982

[51] Int. Cl.³ .............................................. A23L 1/212
[52] U.S. Cl. ..................................... 426/471; 426/457; 426/460; 426/472; 426/473; 426/640; 159/49
[58] Field of Search ............... 426/640, 628, 800, 801, 426/457, 464, 473, 472, 471, 615, 481, 518, 459, 460; 159/42, 49, 47.1, 11 R, 11 B; 241/24

[56] References Cited

U.S. PATENT DOCUMENTS

| | | | |
|---|---|---|---|
| 727,585 | 5/1903 | Bunyan | 426/457 |
| 1,619,202 | 3/1927 | Greenstreet | 426/464 |
| 1,908,489 | 5/1933 | Sartakoff | 426/457 |
| 2,564,296 | 8/1951 | Bostock | 426/464 |
| 2,592,332 | 4/1952 | Reale | 426/801 |
| 2,657,999 | 11/1953 | Rauch | 426/460 |
| 2,759,832 | 8/1956 | Cording | 426/464 |
| 3,203,111 | 8/1965 | Lorant et al. | 159/11 R |
| 3,506,447 | 4/1970 | Billerbeck | 426/640 |
| 3,764,716 | 10/1973 | Rainwater | 426/457 |
| 4,085,233 | 4/1978 | Turover | 426/640 |

FOREIGN PATENT DOCUMENTS

| | | | |
|---|---|---|---|
| 692703 | 8/1964 | Canada | 426/457 |
| 860263 | 1/1971 | Canada | 426/640 |

OTHER PUBLICATIONS

The Freezing Preservation of Foods, Tressler et al., vol. 4, 1968, Avi Publ.
Food Dehydration, Van Arsdel et al., 2nd Ed., vol. I, Avi Publ. 1973.
Fannie Farmer, Boston Cooking-School Cook Book 1951, Little Brown & Co. Publ.
Food Technology 6/66, pp. 111 plus.
Food Technology 1962, vol. XVI #12, p. 103.

Primary Examiner—Steven L. Weinstein
Attorney, Agent, or Firm—Townsend and Townsend

[57] ABSTRACT

A process for dehydrating vegetables comprises first comminuting whole, uncooked vegetables to produce a puree. By passing the puree through a first-stage finishing step, and a second-stage finishing step having a finer screen size than the first stage, a puree substantially free from hardened vegetable particles is obtained. The puree may be dried by a variety of techniques to obtain a dehydrated product which, when reconstituted, displays a particularly smooth texture.

4 Claims, 1 Drawing Figure

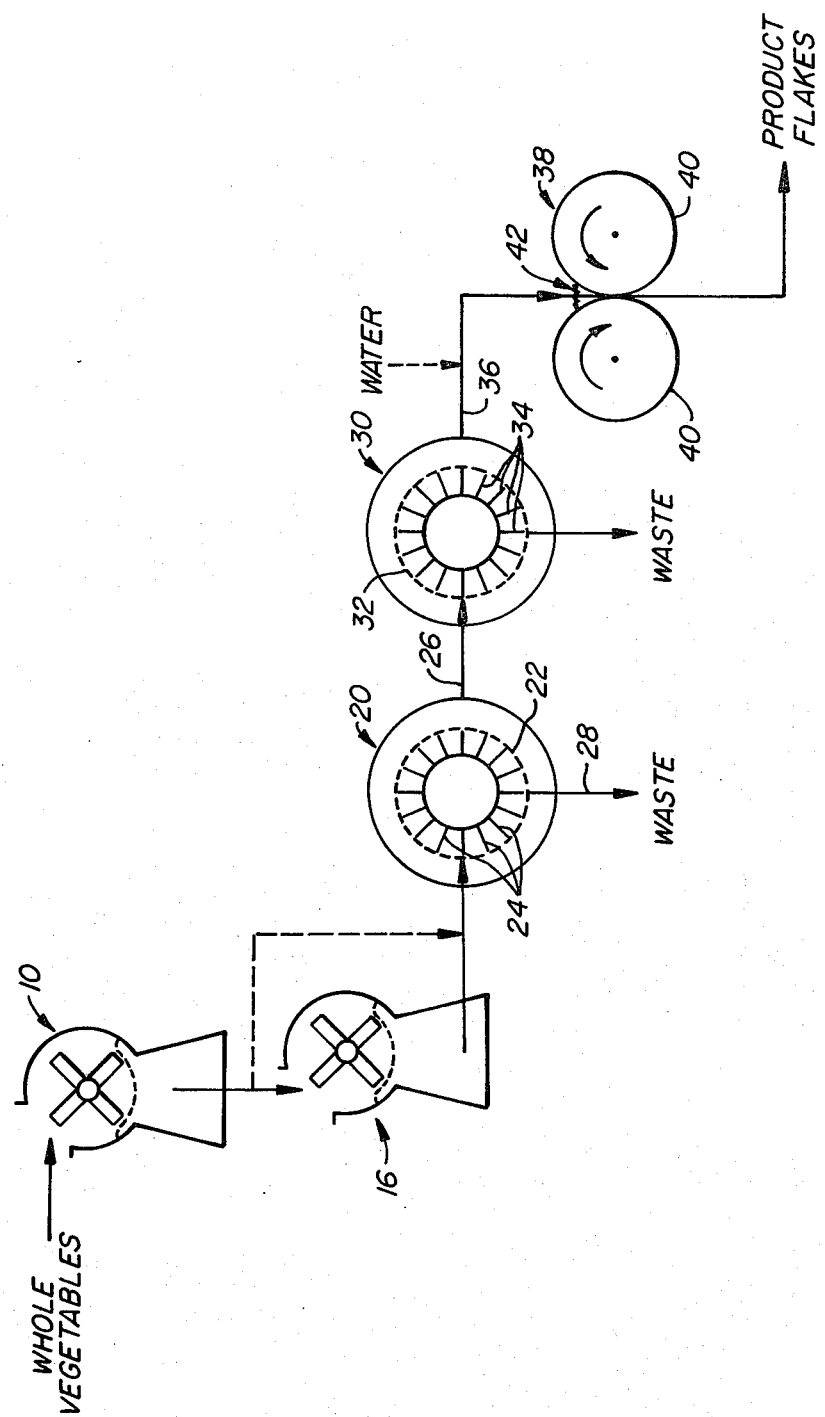

METHOD FOR PRODUCING DRIED, PUREED VEGETABLES

BACKGROUND OF THE INVENTION

The present invention concerns food processing, and more particularly, it concerns a process for forming a dehydrated vegetable product which may be stored for long periods and reconstituted by the addition of liquid.

Vegetables, including peas, green beans, carrots, squash, and the like, may be dehydrated by first forming a puree and then drying that puree on a drum dryer to form a thin sheet of product which may be broken into flakes for packaging and storage. The flake product may then be reconstituted prior to use by the addition of liquid.

In the case of certain vegetables, in particular peas and green beans, the flakes resulting from the above-described process are often unable to absorb sufficient water to properly reconstitute the product. Moreover, the purees of peas and beans both contain hardened tissue which is not significantly softened by cooking or homogenizing processes. In such cases, the reconstituted product is a dispersion of dried and liquefied vegetable material. Qualitatively, the product has often been gritty, dry and difficult to swallow.

It is thus desirable to provide a dehydrated vegetable product which, when reconstituted, absorbs a sufficient amount of water to completely liquefy, and which achieves a smooth texture free from grittiness.

SUMMARY OF THE INVENTION

The present invention is a process for dehydrating vegetables, in particular peas and green beans, wherein the reconstituted product has a uniform consistency and ability to reabsorb water. Fresh or frozen whole vegetables are comminuted to form a puree. The puree is then passed through a first finisher to remove a portion of the coarse vegetable particles which contribute to the gritty texture of the finished product. The first finisher has a screen mesh size typically in the range from 0.060 to 0.020 inch, depending on the particular vegetable being processed. The puree discharged from the first finisher is then passed through a second finisher having a finer screen, typically in the range from 0.030 to 0.010 inch. The second finisher removes substantially all the remaining particles large enough to degrade the final product. The twice-finished vegetable puree is then dried, usually to a maximum thickness of 0.003 inches, and formed into flakes having a desired bulk density. The product obtained by such two-stage finishing has been found to be superior in texture and consistency to a product formed after only one stage of finishing.

It is preferred that the vegetables be comminuted while uncooked, although the frozen vegetables will typically be blanched prior to freezing. It is also desirable that the puree be formed by first coarse grinding the vegetables in a mill to a particle size in the range from 0.120 to 0.060 inch. By then passing the coarse ground vegetable through a second grinding step in a 0.020 to 0.010 inch mill, the product yield may be increased by reducing the coarse vegetable particles to an acceptable size, prior to passing through the two-stage finishing process.

BRIEF DESCRIPTION OF THE DRAWING

The FIGURE is a process flow diagram for the method of the present invention.

DESCRIPTION OF THE PREFERRED EMBODIMENTS

The present invention is a method for producing a dehydrated vegetable product having improved characteristics, particularly an improved ability to reabsorb water and a smoother texture when compared with dehydrated products obtained by other methods.

Many vegetables include hardened tissue and fibers which remain in the dehydrated product formed from the vegetable. For example, peas include sclerenchyma which is a type of supporting tissue found directly underneath the skin. As the pea matures, the sclerenchyma becomes hardened by lignification, resulting in hardened particles which are not softened by either cooking or homogenization techniques. Similarly, green beans include fibers which resist softening by conventional processing methods used in forming dehydrated products.

With the process of the present invention, substantially all of the hardened vegetable particles can be removed from the vegetable puree prior to drying the product to form the product flakes. After the vegetables are comminuted to form the puree, they are directed to a first finisher having a screen size selected to remove a preselected fraction of the hardened particles. The puree is then directed to a second finisher having a finer screen size which removes substantially all the remaining particles which would have a deleterious effect on the product. The puree is then dried on a drum drier into a very thin sheet, typically less than about 0.003 inches, and the product is broken into flakes having the desired bulk density, typically in the range from 17 to 18 lb/ft$^3$.

Referring now to the FIGURE, whole vegetables, such as peas, green beans, carrots, sweet potatoes, and the like, are directed to a grinder 10 where they are comminuted to coarse particles, typically in the range from 0.1 to 0.4 inches. The vegetables fed to the grinder 10 may be fresh or frozen, and it is preferred that the vegetables be uncooked. In the case of peas and green beans, the vegetables are fed with the skin remaining intact. It is preferred to grind green beans to a particle size at the lower end of the range (e.g., 0.1 inch), while peas may be subjected to a somewhat coarser grind (e.g., 0.2–0.3 inches).

The grinder 10 may be any apparatus capable of comminuting the whole vegetables to a particle size in the desired range. In general, hammer mills having a screen size corresponding to the desired particle size will be adequate. In particular, an Urschell 2100 has been found adequate.

After coarse grinding, the vegetables may be fed directly to a first finisher, as described hereinbelow. It is preferred, however, to pass the ground vegetables through a second grinder 16 having a much finer screen size to produce a more uniform puree. The second grinder 16 may also be a hammer mill, preferably having a finer screen size in the range from 0.01 to 0.025 inches. In particular, a Reitz Mill having a screen of 0.016 inches has been found adequate.

The second grinder 16 is able to comminute many of the hardened particles to an acceptable size. This results in less waste as the puree is passed through the finishers, as described hereinbelow, allowing more economic operation without any loss in product quality.

In either case, the puree is fed to a first finisher 20 having a screen size selected to remove a first fraction of the hardened particles remaining in the puree. A finisher is a common processing unit well known in the food processing art. The finisher 20 provides for separation of the coarse material from puree by forcing the puree through a screen 22 by means of a plurality of rotating paddles 24, as illustrated in the FIGURE. An FMC Model 50 Finisher manufactured by the FMC Corporation, Chicago, Ill., and having a screen size in the range from 0.06 to 0.02 inches has been found adequate.

Two streams emerge from the finisher 20, a first stream 26 which has passed through the screen 22 and is free from the majority of the coarse particles, and a second (waste) stream 28 including the larger particles unable to pass through the screen.

A second finisher 30, similar to the first but having a smaller screen size, is provided to complete the removal of the coarse vegetable particles. The finisher 30 includes a screen 32 having openings in the range from 0.030 to 0.010 inches, and paddles 34. As will be appreciated from the experimental results disclosed hereinafter, the provision of a second finisher provides superior results to use of a single finisher having the smaller screen size.

The puree emerging from the second finisher 30 (line 36) is ready to be dried to form the dehydrated product. While the drying might be accomplished in various processing units, such as spray driers, and the like, it is preferred that the product be dried on a drum drier 38 to form a sheet having a precisely controlled thickness and produce a flake having a preselected bulk density.

The puree fed to the drum drier should have a consistency of approximately five units as measured on a Bostwick Consistometer, a device for measuring consistency well known in the food processing art. In the case of vegetables having total solids above about 10%, it may be desirable to add water to achieve the desired consistency. Moreover, the consistency may be varied somewhat depending on the product thickness discharged from the drum drier. If the product is too thick, additional water can be added to reduce the viscosity and provide a thinner layer of product on the drier surface.

The drum drier typically includes a pair of counter-rotating, heated drums 40. The twice-finished puree is discharged into a channel 42 formed between the drums and carried downward through the narrow space between the drums 40 by the rotation thereof. The distance between the drums 40, together with the viscosity of the puree, determine the thickness of the film on the surfaces of the drums and thus the product thickness. A sheet thickness below 0.05 inches, preferably below 0.03 inches, is desired. As the product sheet dries, it is scraped from the drums and broken into flakes for packaging and storage.

EXPERIMENTAL RESULTS

Tests were run comparing the results obtained by various combinations of the process parameters described hereinabove.

Referring to Table 1, frozen Grade 1 peas were processed using different combinations of process steps. In each case, the peas were steam cooked for from 15 to 20 minutes and subjected to from one to three separate grinding operations. After cooking and grinding, the peas were subjected to various combinations of finishing and homogenizing steps. Best results were observed in test no. 7 where whole peas were cooked for 20 minutes, ground to 0.125 inches and subjected to a two-stage finishing process. As can be further observed, regardless of the nature or order of the remaining process steps, a smooth product was obtained only in tests nos. 7, 9 and 10 where double finishing was employed.

TABLE I

| | PEA[1] PROCESSING | | | | | | |
|---|---|---|---|---|---|---|---|
| Test No. | Process Step | | | | | | Product Quality |
| | Grind[2] | Cook[3] | Grind[2] | Grind[2] | Finish[4] | Finish[4] | Homogenize[5] | |
| 1 | — | 15 min | 0.125 in | 0.020 in | — | — | 3000 | Gritty |
| 2 | — | 15 min | 0.25 in | 0.125 in | 0.033 in | — | — | Fairly smooth |
| 3 | — | 15 min | 0.25 in | 0.125 in | 0.033 in | — | 3000 | Less smooth than trial No. 2 |
| 4 | — | 15 min | 0.25 in | 0.125 in | 0.033 in | — | 7500 | Between trials Nos. 2 and 3 |
| 5 | — | 20 min | 0.125 in | — | 0.033 in | — | — | Fairly smooth |
| 6 | — | 20 min | 0.125 in | — | 0.033 in | — | 3000 | Slightly gritty |
| 7 | — | 20 min | 0.125 in | — | 0.033 in | 0.023 in | — | Smooth (best results) |
| 8 | 0.375 in | 10 min | 0.032 in | — | 0.033 in | — | — | Gritty |
| 9 | 0.375 in | 10 min | 0.032 in | — | 0.033 in | 0.023 in | — | Smooth |
| 10 | 0.375 in | 10 min | 0.032 in | 0.032 in | 0.033 in | 0.023 in | — | Smooth |

[1]Frozen whole peas.
[2]Screen size in hammer mill.
[3]Steam cooking at atmosphere pressure.
[4]Screen size.
[5]Homogenization pressure, psi.

Referring now to Table 2, frozen cut green beans were subjected to different combinations of processing steps. Again, best results were observed in those tests (nos. 3, 4, 6 and 8) which involved the double-finishing process. The remaining process steps were less critical.

| | GREEN BEAN[1] PROCESSING | | | | |
|---|---|---|---|---|---|
| Test No. | Process Step | | | | Product Quality |
| | Grind[2] | Cook[3] | Grind[2] | Finish[4] | Finish[4] | |
| 1 | — | 20 min | 0.033 in | — | — | Gritty |
| 2 | — | 20 min | 0.033 in | 0.033 in | — | Slightly grainy |
| 3 | — | 20 min | 0.033 in | 0.033 in | 0.027 in | Smooth |
| 4 | — | 20 min | 0.033 in | 0.033 in | 0.023 in | Smooth |
| 5 | 0.25 in | 25 min | — | 0.033 in | — | Slightly grainy |
| 6 | 0.25 in | 25 min | — | 0.033 in | 0.027 in | Smooth |
| 7 | 0.25 in | 25 min | 0.033 in | 0.033 in | — | Grainy |

-continued

| GREEN BEAN[1] PROCESSING | | | | | | |
|---|---|---|---|---|---|---|
| Test | Process Step | | | | | Product |
| No. | Grind[2] | Cook[3] | Grind[2] | Finish[4] | Finish[4] | Quality |
| 8 | 0.25 in | 25 min | 0.033 in | 0.033 in | 0.23 | Smooth |

[1]Frozen cut green beans
[2]Screen size in hammer mill.
[3]Steam cooking at atmospheric pressure.
[4]Screen size.

The above results indicate that the inclusion of a two-stage finishing process in a method for dehydrating vegetables produces a superior quality product. This is particularly the case with green beans and peas where two-stage finishing appears to remove hardened vegetable material which would otherwise provide a gritty product when the dehydrated flakes are reconstituted.

Although the foregoing invention has been described in some detail by way of illustration and example for purposes of clarity of understanding, it will be obvious that certain changes and modifications may be practiced within the scope of the appended claims.

What is claimed is:

1. A process for dehydrating vegetables selected from the group consisting of peas and green beans, said process comprising:
   comminuting the vegetables to form a puree; passing the puree through a first finisher having a screen size selected to separate a first fraction of coarse vegetable particles from the puree said screen size being in the range from about 0.060 to 0.020 inches; passing the puree through a second finisher having a finer screen size selected to further remove coarse vegetable particles from the puree said screen size being in the range from about 0.030 to 0.010 inches; and drying the twice-finished puree to form a dehydrated product.

2. A process as in claim 1, wherein the twice-finished puree is dried in a drum drier to form a sheet having a thickness not exceeding 0.003 inches.

3. A process as in claim 2, wherein the sheet is flaked to form a product having a bulk density in the range from 16–19 lb/ft$^3$.

4. A process as in claim 1, wherein the comminuted vegetables are passed through a mill prior to finishing to reduce the size of the coarse vegetable particles.

* * * * *